United States Patent
Sato et al.

(10) Patent No.: US 11,104,316 B2
(45) Date of Patent: Aug. 31, 2021

(54) WORK MACHINE AND BRAKING METHOD FOR WORK MACHINE

(71) Applicant: HITACHI CONSTRUCTION MACHINERY CO., LTD., Tokyo (JP)

(72) Inventors: Takayuki Sato, Kashiwa (JP); Takaaki Tanaka, Tsuchiura (JP); Hidefumi Ishimoto, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 225 days.

(21) Appl. No.: 16/329,390

(22) PCT Filed: Mar. 5, 2018

(86) PCT No.: PCT/JP2018/008429
§ 371 (c)(1),
(2) Date: Feb. 28, 2019

(87) PCT Pub. No.: WO2018/180262
PCT Pub. Date: Oct. 4, 2018

(65) Prior Publication Data
US 2019/0217835 A1     Jul. 18, 2019

(30) Foreign Application Priority Data

Mar. 30, 2017   (JP) .............................. JP2017-068039

(51) Int. Cl.
*B60T 13/62*     (2006.01)
*B60T 7/04*      (2006.01)
(Continued)

(52) U.S. Cl.
CPC ................ *B60T 13/62* (2013.01); *B60T 7/04* (2013.01); *B60T 7/12* (2013.01); *B60T 7/16* (2013.01);
(Continued)

(58) Field of Classification Search
CPC ...... B60T 13/62; B60T 13/662; B60T 13/686; B60T 7/12; B60T 7/04; G05D 2201/02; G05D 1/021
See application file for complete search history.

(56) References Cited

U.S. PATENT DOCUMENTS 9,586,563 B2 *   3/2017   Kanai ........................ B60T 8/17
9,730,376 B2 *   8/2017   Behra ..................... A01D 41/02
(Continued)

FOREIGN PATENT DOCUMENTS

| JP | 2004-230908 A | 8/2004 |
| JP | 2006-044620 A | 2/2006 |
| JP | 2012-144255 A | 8/2012 |

OTHER PUBLICATIONS

International Search Report of PCT/JP2018/008429 dated May 5, 2018.

*Primary Examiner* — Xuan Lan Nguyen
(74) *Attorney, Agent, or Firm* — Mattingly & Malur, PC

(57) ABSTRACT

An autonomous traveling vehicle, equipped with autonomous traveling function on a standard machine, has a high-pressure selector valve placed on a flow path in which pressure-oil is supplied from a standard brake valve (SBV) installed in the standard machine to a hydraulic brake. A flow path is installed to connect the high-pressure selector valve and an autonomous brake control valve (ABCV) that is supplied with pressure-oil delivered by a hydraulic pump. Further, an autonomous traveling controller is installed to perform control for autonomous travel, and an autonomous brake controller is installed to perform open or close control on the ABCV in response to a braking instruction from the autonomous traveling controller. When the brake pedal is stepped on, the pressure-oil flows from the SBV to the hydraulic brake, and when the autonomous traveling con-
(Continued)

troller outputs a stop instruction, the pressure-oil flows from the ABCV to the hydraulic brake.

3 Claims, 10 Drawing Sheets

(51) Int. Cl.
| | | |
|---|---|---|
| *B60T 7/12* | (2006.01) | |
| *B60T 13/68* | (2006.01) | |
| *B60T 13/66* | (2006.01) | |
| *G05D 1/02* | (2020.01) | |
| *B60T 7/16* | (2006.01) | |
| *B60T 13/18* | (2006.01) | |

(52) U.S. Cl.
CPC ............ *B60T 13/18* (2013.01); *B60T 13/662* (2013.01); *B60T 13/68* (2013.01); *B60T 13/686* (2013.01); *G05D 1/021* (2013.01); *G05D 2201/02* (2013.01)

(56) References Cited

U.S. PATENT DOCUMENTS

| | | | |
|---|---|---|---|
| 9,771,078 B2* | 9/2017 | Saito | B60W 10/20 |
| 2015/0112537 A1* | 4/2015 | Kawamata | G05D 1/0061 |
| | | | 701/23 |
| 2018/0304828 A1* | 10/2018 | Kitani | B60W 50/0205 |
| 2019/0256061 A1* | 8/2019 | Nemeth | B60T 17/22 |

* cited by examiner

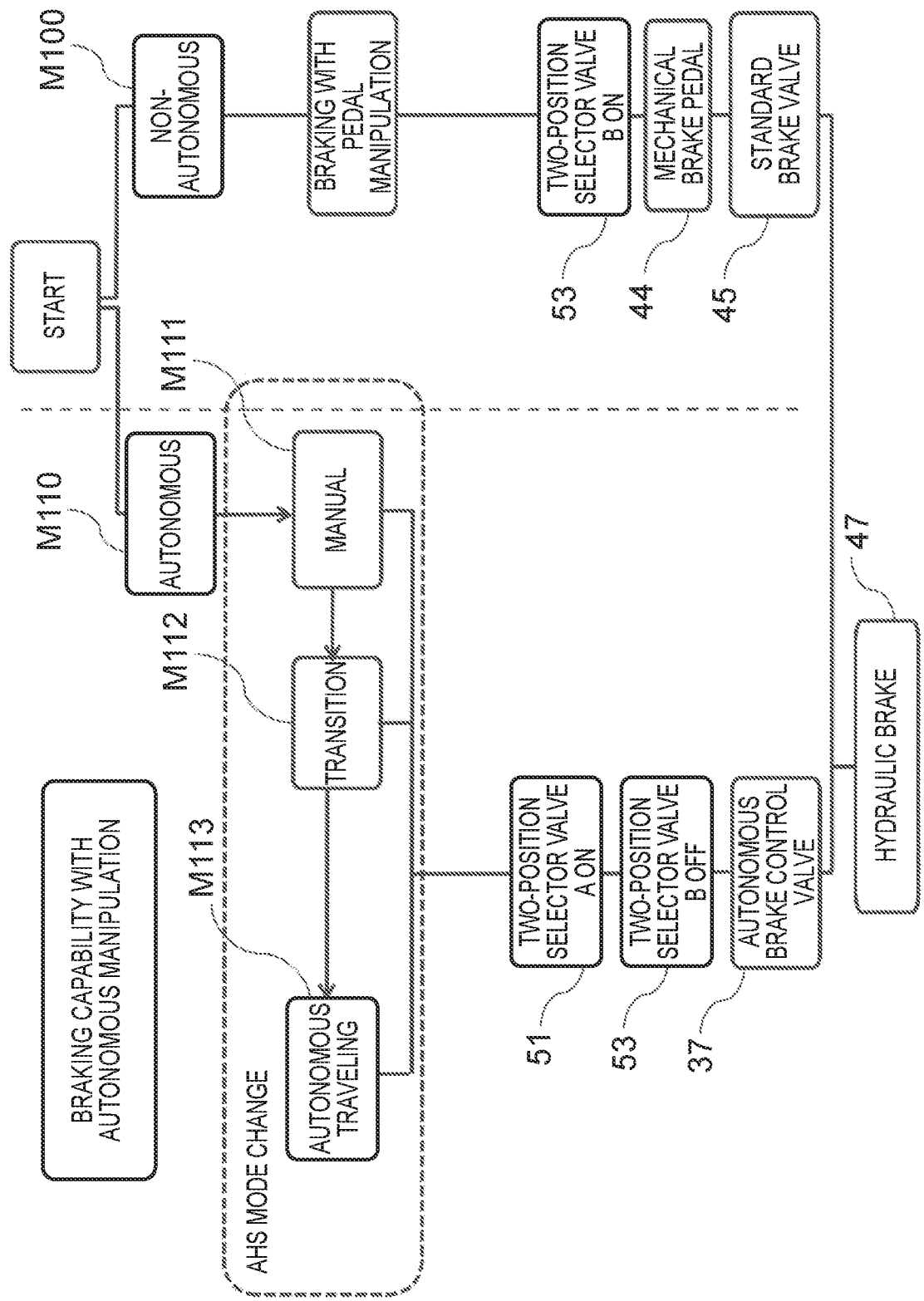

WORK MACHINE AND BRAKING METHOD FOR WORK MACHINE

TECHNICAL FIELD

The present invention relates to work machines, and more particularly, to a braking technique for a mining work machine which autonomously travels.

BACKGROUND ART

Patent Literature 1 discloses a manned or unmanned operation selection traveling-vehicle which "is a vehicle having switching means for allowing selection between manned operation in which a driver gets aboard the vehicle to operate the vehicle for traveling and unmanned operation in which the vehicle automatically travels without a driver aboard, and includes: an electromagnetic brake that is placed in a power transmission system from an engine and applies a brake during non-energization, an emergency stop switch that is actuated by manual manipulation, an emergency stop receiver that is actuated by receiving an incoming emergency stop signal, a system having a self-diagnostic function, and an emergency stop control section that puts the electromagnetic brake into a brake state on the basis of a signal from any one of at least the emergency stop switch, the emergency stop receiver and the system during the unmanned operation (excerpts from abstract)".

CITATION LIST

Patent Literature

PATENT LITERATURE 1: JP-A No. 2006-44620

SUMMARY OF INVENTION

Technical Problem

In a wide-area worksite such as a quarry site, a mine and the like, the introduction of autonomous mine vehicles (particularly, dump trucks) is desired for the purpose of achieving the labor savings and improving the productivity. However, an autonomous mine vehicle is always not required to be traveled autonomously, and an operator aboard sometimes may travel it, for example, from a machine parking space to a maintenance garage. Therefore, because the autonomous mine vehicle has two brake systems of a control system based on instructions from an autonomous travel controller and a manipulation system based on manipulation of the operator aboard the vehicle, there is a need to contrive to put the systems in proper motion from the perspective of safety. In this respect, although the technique disclosed in Patent Literature 1 includes a plurality of brake systems, the brake based on any one of the brake systems is applied only, and there is no consideration given to the perspective which brake system of the control system and the manipulation system should be preferentially put in motion.

The present invention has been achieved in view of such circumstances, and it is an object thereof to provide a technique for efficient operation of a control system brake and a manipulation system brake in an autonomous traveling vehicle in response to the operating conditions of the autonomous traveling vehicle.

Solution to Problem

To solve the above object, a work machine according to the present invention includes: an engine, a hydraulic oil tank that holds hydraulic oil, a hydraulic pump that is driven by the engine and delivers the hydraulic oil in the hydraulic oil tank as pressure oil, a standard brake valve that is supplied with the pressure oil delivered by the hydraulic pump, a brake pedal that allows the standard brake valve to open or close, and a hydraulic brake that is operated with the pressure oil supplied from the standard brake valve. The work machine includes: an autonomous brake control valve that is supplied with the pressure oil delivered by the hydraulic pump, a first supply flow path in which the pressure oil is supplied from the hydraulic pump to the autonomous brake control valve, a second supply flow path in which pressure oil is supplied from the hydraulic pump to the standard brake valve, a high-pressure selector valve that is placed on a flow path in which pressure oil is supplied from the standard brake valve to the hydraulic brake, a flow path that connects the autonomous brake control valve and the high-pressure selector valve, an autonomous traveling controller that performs control for causing the work machine to travel in autonomous manner, and an autonomous brake controller that performs open or close control on the autonomous brake control valve in response to a braking instruction from the autonomous traveling controller, in which pressure oil at a higher pressure between the pressure oil supplied from the standard brake valve and the pressure oil supplied from the autonomous brake control valve is supplied from the high-pressure selector valve to the hydraulic brake.

Advantageous Effects of Invention

According to the present invention, it is possible to provide the technique for efficient operation of a control system brake and a manipulation system brake in an autonomous traveling vehicle in response to the operating conditions of the autonomous traveling vehicle. The above and other problems, configurations and advantageous effects will be more apparent from the following description of embodiments.

BRIEF DESCRIPTION OF DRAWINGS

FIG. 10 is an explanatory actuation diagram (2) of a brake controller of the autonomous traveling vehicle of the third embodiment.

DESCRIPTION OF EMBODIMENTS

The embodiments of the present invention will hereinafter be described in detail based on the drawings. Throughout all the figures for describing the embodiments, members having the same functions are designated by assigning the same or related numerals or signs, and their repeated descriptions are omitted. In the following embodiments, descriptions of the same or similar elements will not be repeated in principle unless specifically needed.

First Embodiment

Figure 1:
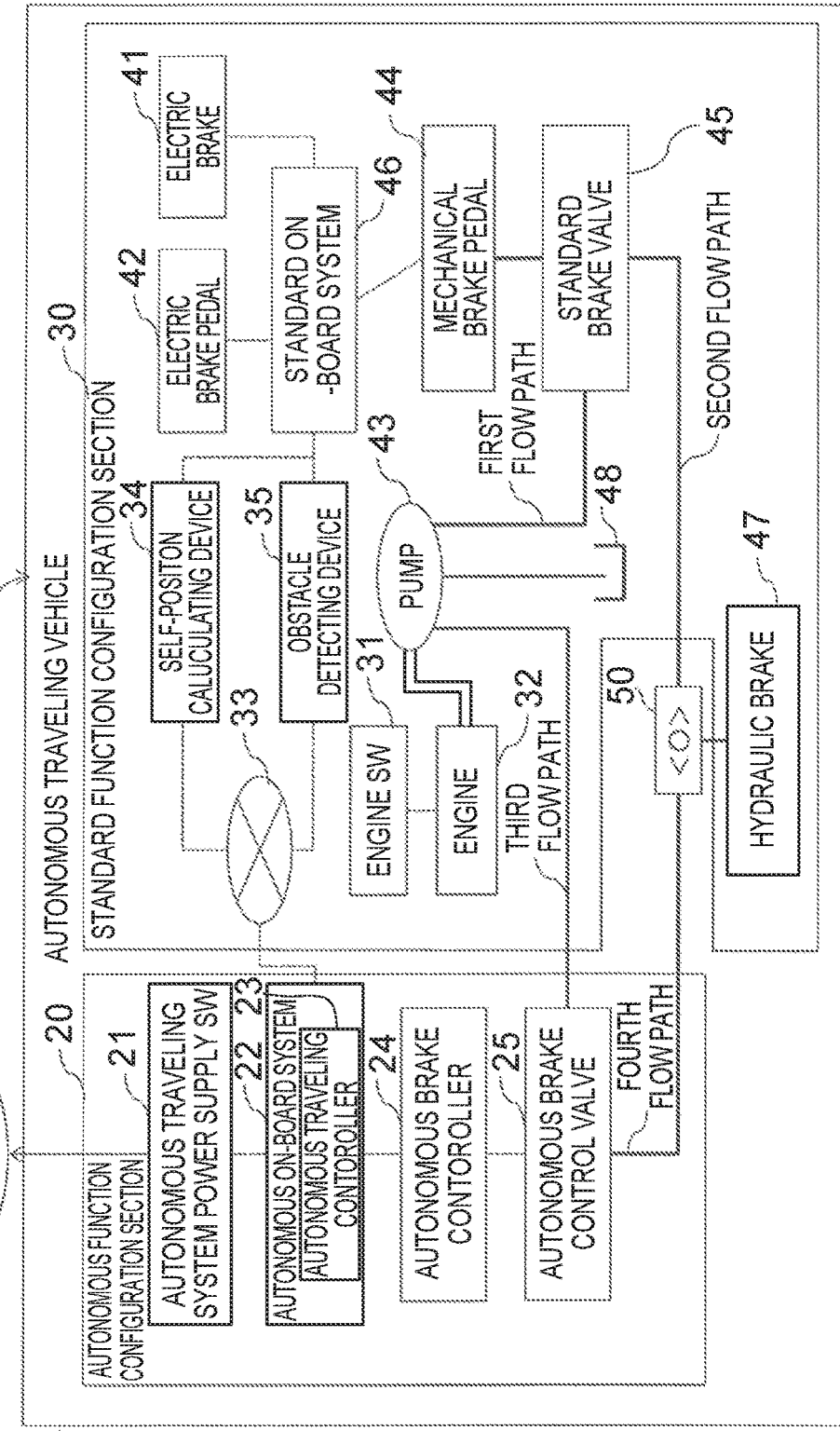
FIG. 1 is a diagram schematically illustrating the configuration of an autonomous traveling vehicle of a first embodiment.
Figure 2:
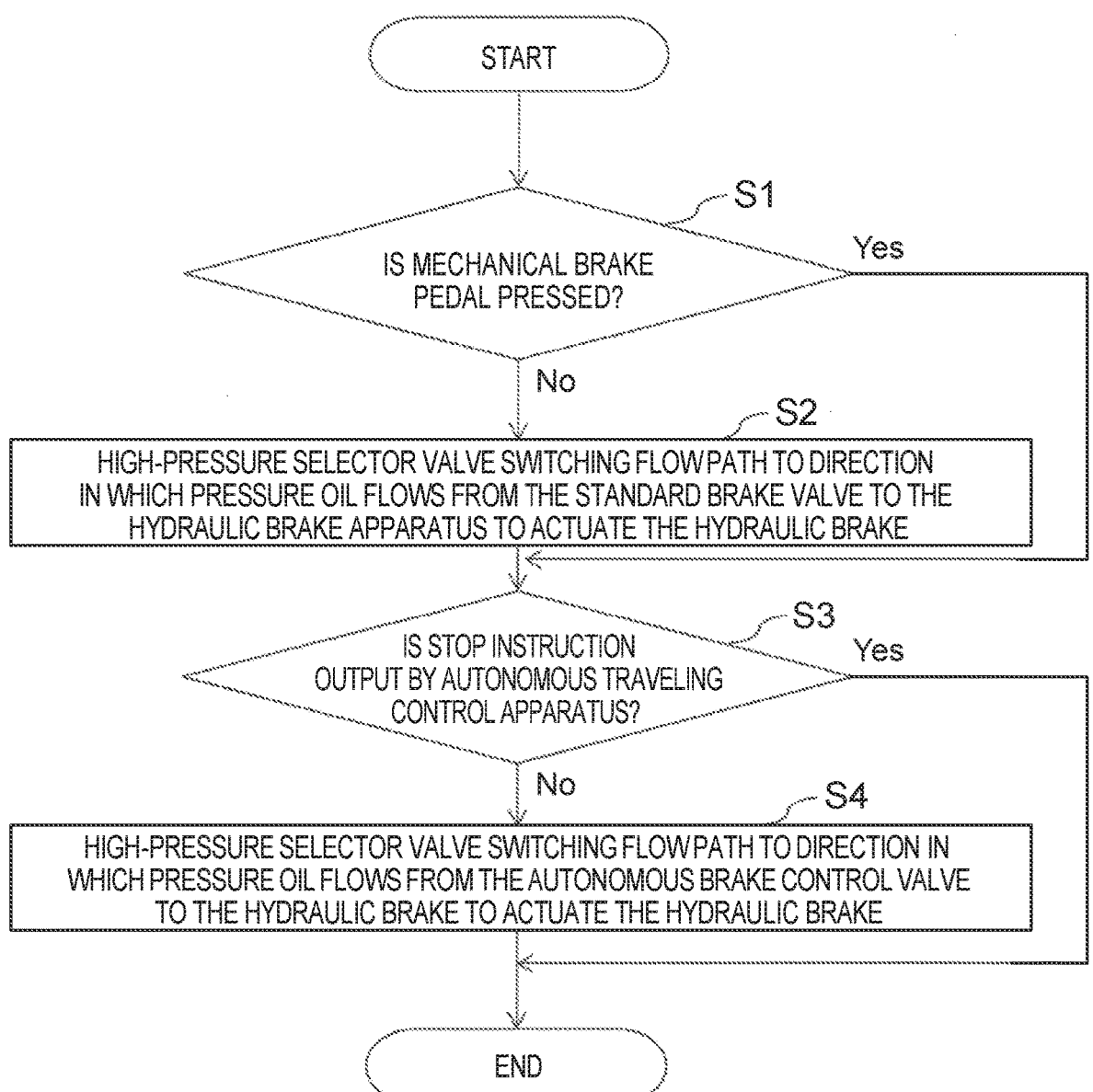
FIG. 2 is a flowchart illustrating a braking method for the autonomous traveling vehicle of the first embodiment.

FIG. 1 is a diagram schematically illustrating the configuration of an autonomous traveling vehicle of a first embodiment. Also, FIG. 2 is a flowchart illustrating a braking method for the autonomous traveling vehicle of the first embodiment.

The autonomous control-center system 10 illustrated in FIG. 1 is a system that manages kinds of work, traveling positions and traveling conditions of work machines including a plurality of autonomous traveling vehicles 1 and manned vehicles (not shown) which perform works in a worksite such as a mine or the like, and that plays a role in instructing what actions the autonomous traveling vehicles 1 or the manned vehicles should take in future in step with the work process in the worksite. An operator in control-center transmits instructions of the autonomous control-center system 10 or the like to the plurality of autonomous traveling vehicles 1, the manned vehicles and the like through a wireless communication network 11.

The autonomous traveling vehicle 1 is a vehicle mounted on an autonomous traveling feature to a so-called manned vehicle which is manipulated and operated by an operator aboard. It is configured of retrofitting the manned vehicle with an autonomous traveling vehicle system for the autonomous traveling vehicle to travel autonomously according to control-center instructions from the autonomous control-center system 10. A description in the embodiment is given by using a mine dump truck as an example of autonomous traveling vehicles, but a type of the autonomous traveling vehicles of the embodiment is not limited to a dump truck and may be a sprinkler truck or a light vehicle.

The autonomous traveling vehicle 1 is configured to include a standard function configuration section 30 installed in manned vehicles as standard, and an autonomous function configuration section 20 installed in an add-on manner.

The standard function configuration section 30 is configured to include an engine switch (SW) 31 including an ignition key, an engine 32, a CAN (Control Area Network) 33, a self-position calculating device 34 such as GPS, IMU or the like, an obstacle detecting device 35 including a millimeter-wave radar and LIDAR, an electric brake 41, an electric brake pedal 42, a hydraulic pump 43, a mechanical brake pedal 44, a standard brake valve 45, a standard on-board system 46, a hydraulic brake 47, and a hydraulic oil tank 48 holding hydraulic oil.

Meanwhile, the autonomous function configuration section 20 includes an autonomous traveling vehicle system power supply switch (SW) 21, an autonomous on-board system 22, an autonomous traveling controller 23 included in the autonomous on-board system 22, an autonomous brake controller 24, and an autonomous brake control valve 25.

The autonomous on-board system 22 is connected to the CAN 33, and acquires position signals from the self-position calculating device 34 and detection signals from the obstacle detecting device 35 through the CAN 33. The autonomous on-board system 22 performs the autonomous traveling control to cause the autonomous traveling vehicle 1 to follow and travel along a predetermined travel route based on the position signals and detection signals, and performs the execution control for avoidance action taken if an obstacle is on the travel route.

The autonomous traveling controller 23 is included in part of the autonomous on-board system 22, and outputs a stop instruction and a braking instruction to the autonomous brake controller 24 if necessary, for the autonomous traveling control and the avoidance action.

The autonomous brake controller 24 performs the opening or closing control on the autonomous brake control valve in response to the stop instruction and the braking instruction.

The hydraulic pump 43 and the standard brake valve 45 are connected through a first flow path. In turn, the standard brake valve 45 and the hydraulic brake 47 are connected through a second flow path. A high-pressure selector valve 50 is placed on the second flow path.

Further, the hydraulic pump 43 and the autonomous brake control valve 25 are connected through a third flow path (corresponding to a "first supply flow path" in claims), and in turn the autonomous brake control valve 25 and the high-pressure selector valve 50 are connected through a fourth flow path. In other words, a flow path from the autonomous brake control valve 25 toward the hydraulic brake 47 is connected to the second flow path in which pressure oil flows from the standard brake valve 45 via the high-pressure selector valve 50 to the hydraulic brake 47. It is noted that each flow path is configured with hydraulic piping.

In the standard function configuration section 30, upon the operator using the engine SW 31 to start up the engine, the engine 32 starts up and the hydraulic pump 43 is driven by the engine 32 to pump up hydraulic oil out of the hydraulic oil tank 48 for delivery. The pressure oil thus delivered by the hydraulic pump 43 passes through the first flow path to be supplied to the standard brake valve 45. In this stage, as illustrated in FIG. 2, if the operator depresses the mechanical brake pedal 44 (step S1/Yes), the standard brake valve 45 opens at an angle according to the manipulated variable of the depression (the depression amount), so that the pressure oil passes through the second flow path to flow into the high-pressure selector valve 50.

The high-pressure selector valve 50 opens either the second flow path or the fourth flow path, whichever has a higher pressure therein. Therefore, upon the operator depressing the mechanical brake pedal 44, the pressure oil flows through the standard brake valve 45 toward the high-pressure selector valve 50 to be supplied to the hydraulic brake 47 (step S2). Thus, the hydraulic brake 47 can be activated by the brake manipulation of the operator.

Also, in the autonomous function configuration section 20, the hydraulic oil pumped up from the hydraulic oil tank 48 by the hydraulic pump 43 is supplied via the third flow path to the autonomous brake control valve 25. The autonomous brake controller 24 controls the opening or closing of, that is, determines the opening degree of, the autonomous brake control valve 25 based on the stop instruction or a deceleration instruction from the autonomous traveling controller 23, and then the autonomous brake controller 24 outputs a valve control signal indicative of the opening degree to the autonomous brake control valve 25 (step S1/No, step S3/Yes). Thus, the amount of pressure oil corresponding to the opening degree of the autonomous brake control valve 25 flows through the fourth flow path to the high-pressure selector valve 50.

When the pressure in the fourth flow path is higher than the pressure in the second flow path, the high-pressure selector valve 50 switches the flow path to the direction in which the pressure oil from the fourth flow path flows toward the hydraulic brake 47. As a result, upon the autonomous on-board system 22 outputting a stop instruction or a deceleration instruction, the autonomous brake control valve 25 is opened to supply the pressure oil to the hydraulic brake 47 through the high-pressure selector valve 50, thus braking operation is performed (step S4). Where the mechanical brake pedal is not pressed (step S1/No) and the autonomous traveling controller does not output a stop instruction (step S3/No), the process is terminated without actuation of the hydraulic brake 47.

Figure 3:
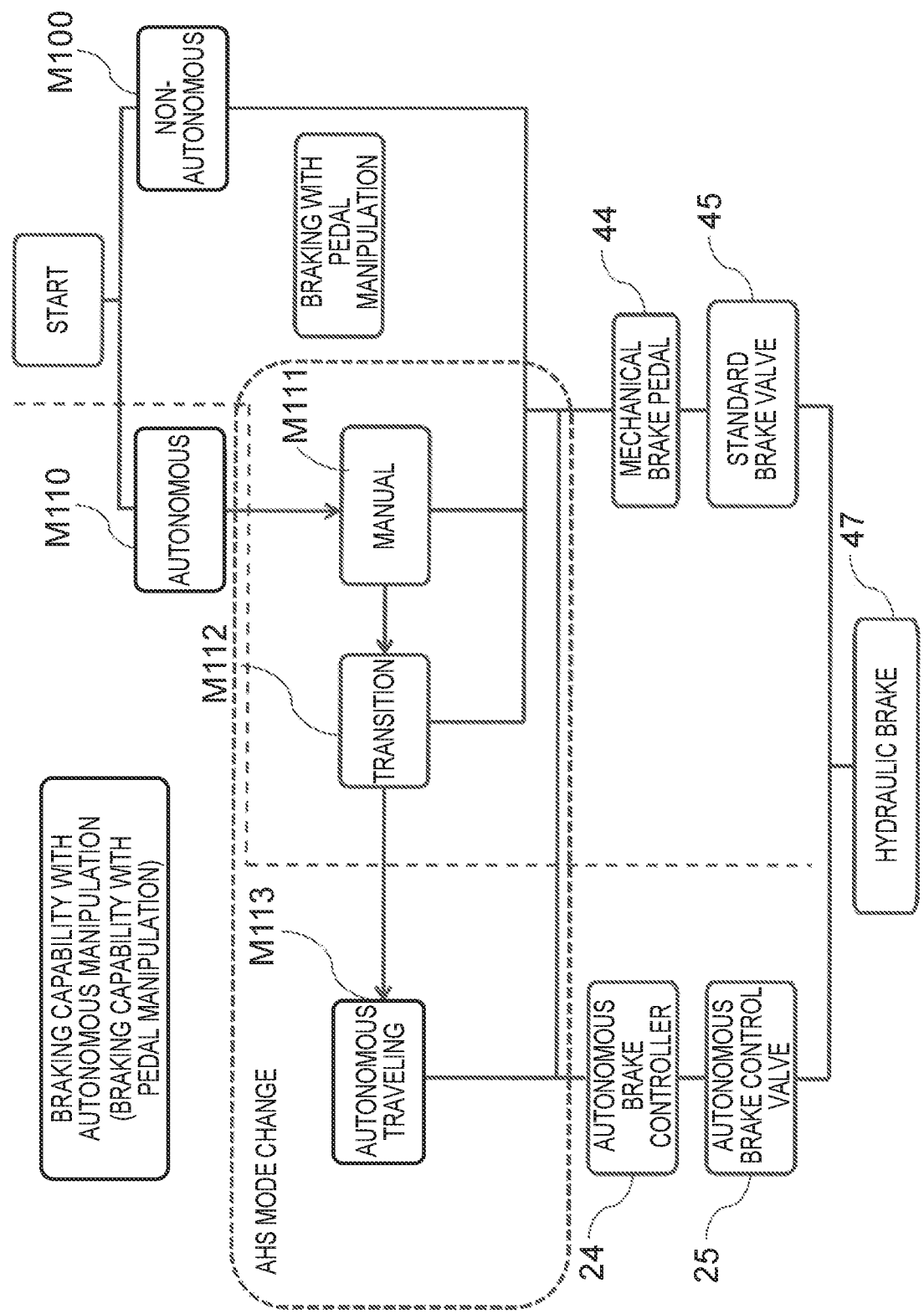
FIG. 3 is an explanatory actuation diagram (1) of a brake controller of the autonomous traveling vehicle of the first embodiment.
Figure 4:
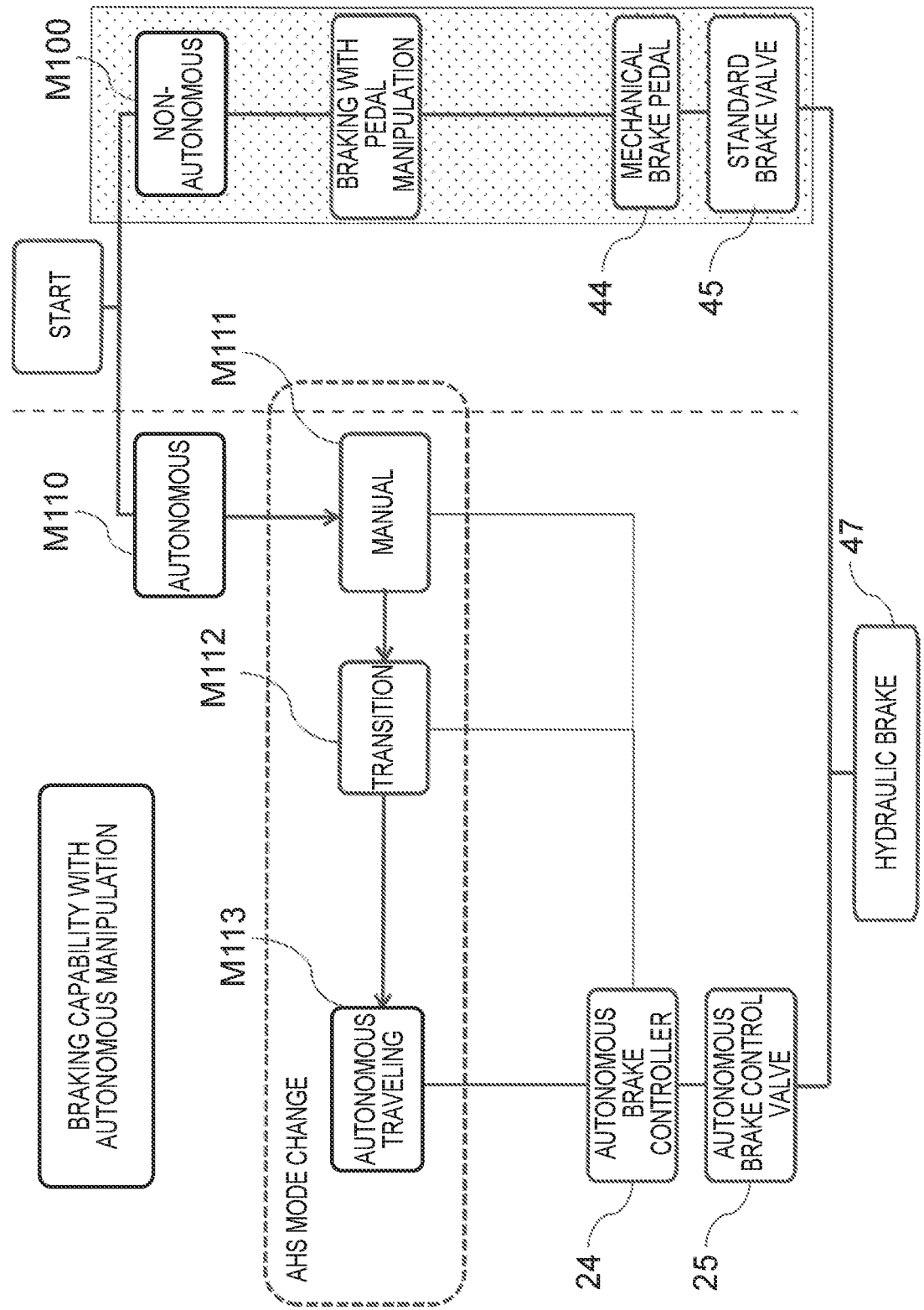
FIG. 4 is an explanatory actuation diagram (2) of a brake controller of the autonomous traveling vehicle of the first embodiment.

A work mode of the autonomous traveling vehicle 1 will now be described with reference to FIG. 3, FIG. 4. FIG. 3 is an explanatory actuation diagram (1) of the brake controller of the autonomous traveling vehicle of the first embodiment. FIG. 4 is an explanatory actuation diagram (2) of the brake controller of the autonomous traveling vehicle of the first embodiment.

The autonomous traveling vehicle 1 receives an instruction from the autonomous control-center system 10 to perform haulage work (involving traveling, turning, stopping and the like) in the mine in an unmanned and autonomous manner in principle. However, when the autonomous traveling vehicle 1 autonomously travels, it does not always travel with no operator aboard, and there are situations in which the autonomous traveling vehicle 1 travels with operator aboard such as for creating map data, for active working data measurement in autonomous travel, for a prior verification test, for maintenance, for a refueling work, and the like. Because of this, simply switching between manned operation and autonomous traveling operation may result in unsafe situations.

To address the situations, as illustrated in FIG. 3, the autonomous traveling vehicle 1 has broadly a non-autonomous mode M100 and an autonomous mode M110.

The non-autonomous mode M100 is a normal manned operation mode of actuation through operator manipulation in the condition where the autonomous traveling vehicle system power supply SW 21 of the autonomous traveling vehicle 1 is turned off.

The autonomous mode M110 is in the condition where the autonomous traveling vehicle system power supply SW 21 is turned on, in which there are three modes, a manual mode M111, a transition mode M112 and an autonomous traveling mode M113.

In the autonomous traveling vehicle 1, at the stop state, the operator turns on the engine SW 31 to start up the engine 32. And, the autonomous traveling vehicle 1 starts up in the non-autonomous mode M100.

Then, upon turn-on of the autonomous traveling vehicle system power supply SW 21, the state of the autonomous traveling vehicle proceeds the autonomous mode M110, and the autonomous traveling vehicle starts up on the manual mode M111 of the autonomous mode M110. This state does not allow for the autonomous travel.

Then, the state of the autonomous traveling vehicle proceeds the transition mode M112, which is a preparatory stage to proceed the autonomous traveling mode M113. At the stage of proceeding the transition mode M112, the operator leaves the autonomous traveling vehicle 1. After the operator has moved to a safe place, another operator with an administrative right (hereinafter referred to as a "control-center operator") uses the autonomous control-center system 10 to shift to the autonomous traveling mode M113. Only after the autonomous traveling vehicle 1 proceeds to this state, it can be put in autonomous motion.

Also, in the autonomous traveling mode M113, the case where the operator sits in the operator' seat may occur. In this case, while the operator is aboard the autonomous traveling vehicle 1, the operator may get in contact with the control-center operator in order to control shifting to the autonomous traveling mode M113 from the autonomous control-center system 10, and thus the autonomous motion can be achieved.

As described above, the autonomous traveling vehicle 1 has four work modes to accommodate various situations.

In spite of the autonomous traveling vehicle 1, there is a possibility that the operator gets aboard and operates the autonomous traveling vehicle 1 in all the above four work modes. From this, a need to allow the brake manipulation by the operator arises in all the work modes.

In the non-autonomous mode M100, the autonomous traveling vehicle system power supply SW 21 of the autonomous function configuration section 20 of the autonomous traveling vehicle 1 is not turned on, so that the autonomous on-board system 22, the autonomous traveling controller 23 and the autonomous brake controller 24 are not activated and therefore a signal from the autonomous control-center system 10 cannot be received. Thus, the operator steps on the mechanical brake pedal 44, so that the pressure oil is supplied from the standard brake valve 45 via the high-pressure selector valve 50 to the hydraulic brake 47 to stop the autonomous traveling vehicle 1.

For the autonomous mode M110, there exists the three modes, specifically, the manual mode M111, the transition mode M112 and the autonomous traveling mode M113, and the modes are switched in this order through the autonomous mode change in order to achieve the autonomous travel. Then, the mode change may be performed at an operator's seat (FIG. 3) and may be performed above ground (FIG. 4).

Where the mode change is performed at the operator's seat (FIGS. 1, 3), upon turn-on of the autonomous traveling vehicle system power supply SW 21, the autonomous traveling vehicle 1 starts the state of the manual mode M111 of the autonomous mode M110, and then the state of the autonomous traveling vehicle proceeds the transition mode M112. In these two states, the autonomous travel is not allowed yet, and hence the operator operates the mechanical brake pedal 44 so that the standard brake valve 45 is moved to actuate the hydraulic brake 47 in order to stop the autonomous traveling vehicle 1. Then, the state of the autonomous traveling vehicle proceeds the autonomous traveling mode M113, and thus the autonomous brake control becomes possible.

Here, after the state of the autonomous traveling vehicle proceeds the transition mode M112, the operator may leave the autonomous traveling vehicle 1 or may remain aboard the autonomous traveling vehicle 1.

In the case where the operator leaves the autonomous traveling vehicle 1, after the operator has moved to a safe place, the control-center operator controls shifting to the autonomous traveling mode M113 from the autonomous control-center system 10. In this state, the autonomous traveling vehicle 1 autonomously operates with no operator aboard, and the autonomous brake controller 24 opens the autonomous brake control valve 25 to actuate the hydraulic brake 47 in order to stop the autonomous traveling vehicle 1.

In the case where the operator remains sit in the operator' seat, the operator gets in contact with the control-center operator to make a request to control shifting to the autonomous traveling mode M113 from the autonomous control-center system 10. In this state, the autonomous traveling vehicle 1 autonomously operates although with the operator aboard, i.e. although the operator aboard sits in the operator' seat. At that time, the brake may be autonomously actuated to stop the autonomous traveling vehicle 1, or alternatively, the operator may operate the mechanical brake pedal 44 to stop the autonomous traveling vehicle 1.

In the case where the mode change is performed above ground (FIGS. 1, 4), a starter (not shown) installed in a lower portion of the autonomous traveling vehicle 1 is used to perform an autonomous mode change. Then, upon turn-on of the autonomous traveling vehicle system power supply SW 21, the autonomous traveling vehicle starts the manual mode M111 in the autonomous mode M110, and then the state of the autonomous traveling vehicle proceeds the transition mode M112. In this state, because of no operator aboard the operator' seat, it is impossible to operate the mechanical brake pedal 44 to stop the vehicle. Therefore, remote stop control is used to actuate the brake in an autonomous manner in order to stop the autonomous traveling vehicle 1. The autonomous control-center system 10 transmits a remote stop signal to the autonomous traveling controller 23 to cause the autonomous traveling controller 23 to provide a stop instruction to the autonomous brake controller 24, and in turn the autonomous brake controller 24 outputs a valve control signal to the autonomous brake control valve 25 to open the valve. As a result, the pressure oil from the hydraulic pump 43 is sent via the high-pressure selector valve 50 to the hydraulic brake 47 to stop the autonomous traveling vehicle 1.

Then, the state of the autonomous traveling vehicle proceeds the autonomous traveling mode M113, whereupon the autonomous brake control becomes possible. Here, after the transition mode M112 has been entered, the operator leaves the autonomous traveling vehicle 1 and moves to a safe place. Then, the control-center operator controls shifting to the autonomous traveling mode M113 from the autonomous control-center system 10. In this state, the autonomous traveling vehicle 1 autonomously operates with no operator aboard, and the autonomous brake controller 24 opens the autonomous brake control valve 25 to actuate the hydraulic brake 47 in order to stop the autonomous traveling vehicle 1.

In the autonomous traveling vehicle 1 of the embodiment, the standard function configuration section 30 and the autonomous function configuration section 20 are coupled to each other via the high-pressure selector valve 50 through the hydraulic piping. Then, the autonomous traveling vehicle 1 is incorporated with the brake motion (manipulation system) effected by the manipulation by the operator aboard the autonomous traveling vehicle 1, and the brake motion (control system) effected by the autonomous function configuration section 20. Accordingly, even when the autonomous function configuration section 20 does not put the hydraulic brake 47 in motion, the hydraulic brake 47 can be put in motion by the operator depressing the mechanical brake pedal 44. As a result, for actuation of the hydraulic brake 47, the brake motion by the manipulation system can be assigned higher priority than the brake motion by the control system.

Further, according to the embodiment, in all the work modes of the autonomous traveling vehicle, the brake is made capable of being actuated through the brake pedal manipulation. Because of this, in the autonomous traveling mode in which travel motion, turn motion, stop motion and the like are autonomously performed according to the instructions from the autonomous control-center system 10, in the situation where an operator aboard the vehicle carries out traveling operation, the brake manipulation is enabled at the operator's discretion, and therefore the vehicle can be stopped with safety. In the other work modes of the non-autonomous mode, the manual mode in the autonomous mode, and the transition mode for a transition to the autonomous traveling mode when the operators aboard the vehicle performs vehicle manipulation, as a matter of course, the vehicle can be stopped with safety through the brake manipulation because the operator aboard the vehicle performs vehicle manipulation.

Further, in the autonomous traveling vehicle 1 according to the embodiment, the high-pressure selector valve 50 can be retrofitted onto the second flow path (the flow path for supplying pressure oil from the standard brake valve 45 to the hydraulic brake 47) of a standard machine equipped with only the standard function configuration section 30. And, the autonomous brake control valve 25 is connected to the hydraulic brake 47 via the high-pressure selector valve 50, and also the upstream side of the autonomous brake control valve 25 is connected to the hydraulic pump 43. As a result, the autonomous traveling vehicle system, which includes the autonomous on-board system 22, autonomous traveling controller 23, autonomous brake controller 24 and autonomous brake control valve 25, can be used to operate the hydraulic brake 47 installed in the standard machine. In short, the autonomous function configuration section 20 can be retrofitted to a standard machine. As a result, an existing standard machine in service in a mine can be remade into the autonomous traveling vehicle.

Second Embodiment

Figure 5:
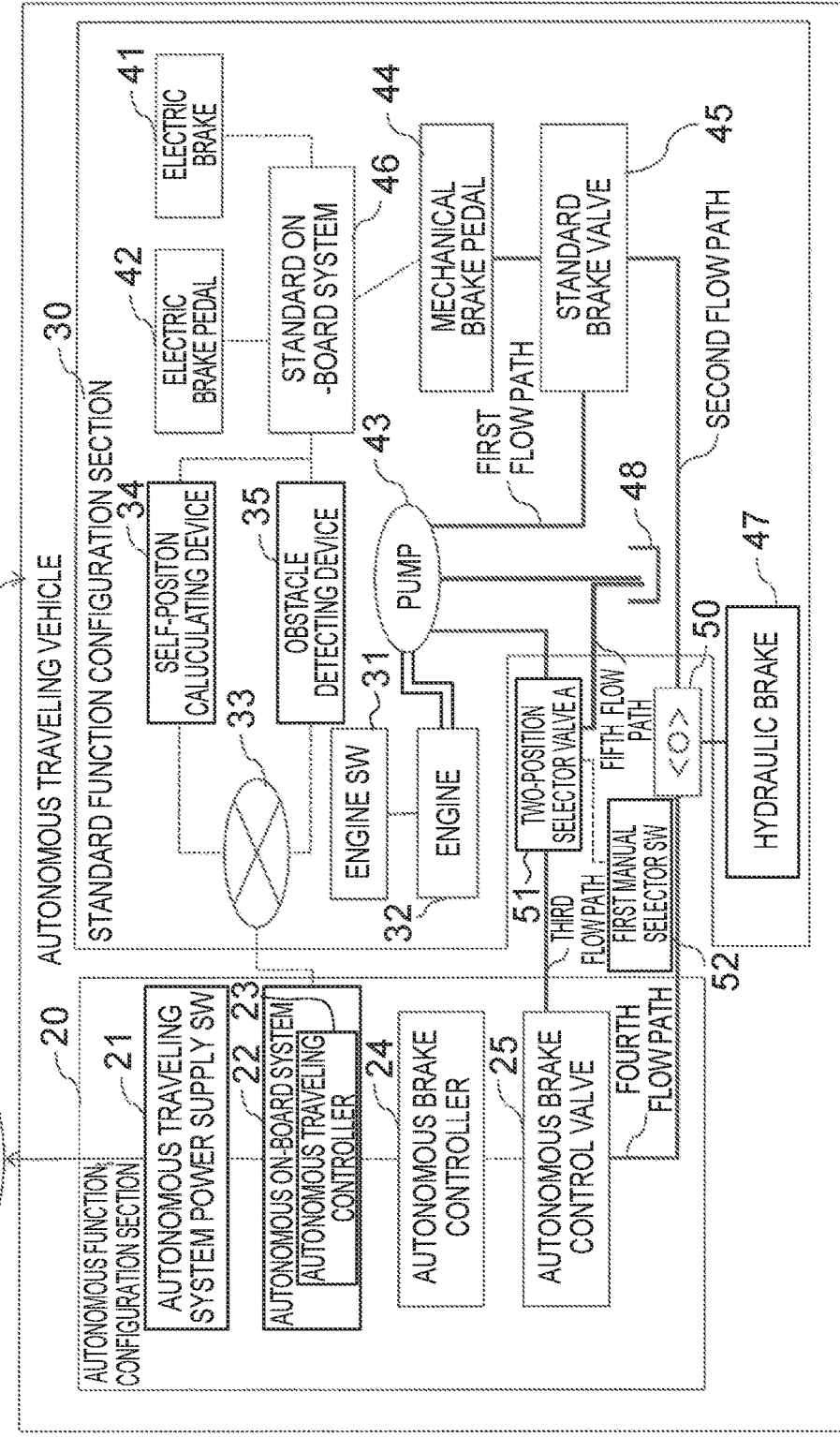
FIG. 5 is a diagram schematically illustrating the configuration of an autonomous traveling vehicle of a second embodiment.

FIG. 5 is a diagram schematically illustrating the configuration of an autonomous traveling vehicle according to a second embodiment.

A point of difference of a dump truck according to the second embodiment from the first embodiment is that a two-position selector valve A51 (corresponding to a first two-position selector valve) is placed on the third flow path forming part of the hydraulic piping and connecting between the hydraulic pump 43 and the autonomous brake control valve 25, and a first manual selector SW 52 (corresponding to a first manual operating device) is installed to perform switching operation between directions in which the pressure oil supplied from the two-position selector valve A51 should flow. The upstream side of the two-position selector valve A51 is connected to the hydraulic pump 43, while an outlet on one downstream side is connected to the autonomous brake control valve 25 and an outlet on the other downstream side is connected to the hydraulic oil tank 48. The flow path connected to the hydraulic oil tank 48 refers to a fifth flow path (corresponding to a "first discharge flow path"). That is, the two-position selector valve A51 is a valve to select whether the pressure oil from the hydraulic pump 43 is to flow into the autonomous brake control valve 25 or return to the hydraulic oil tank 48. The flow-path switching is performed by the operator manually operating the first manual selector SW 52, rather than the control by the autonomous brake controller 24. As a result, the autonomous control-center system is inhibited from switching the two-position selector valve A51 contrary to operator's intention.

The two-position selector valve A51 switches between the flow path in which the pressure oil from the hydraulic pump 43 flows toward the autonomous brake control valve 25 and the flow path in which the pressure oil from the hydraulic pump 43 flows toward the hydraulic oil tank 48 (the fifth flow path). In the former, when the autonomous brake controller 24 receives a stop instruction from the autonomous control-center system 10 via the autonomous traveling controller 23, the autonomous brake control valve 25 opens to send the pressure oil from the hydraulic pump 43 via the high-pressure selector valve 50 to the hydraulic brake 47 so that the autonomous traveling vehicle 1 is stopped.

In the latter, the pressure oil from the hydraulic pump 43 flows into the hydraulic oil tank 48, and therefore no pressure oil flows into the autonomous brake control valve 25. Because of this, the pressure oil from the autonomous brake control valve 25 is not sent via the high-pressure selector valve 50 into the hydraulic brake 47, so that the autonomous traveling controller 23 cannot stop the autonomous traveling vehicle 1. That is, in the autonomous traveling vehicle 1, switching the two-position selector valve A51 enables deactivation of the autonomous control brake, i.e., positively rendering the autonomous control brake inoperable.

Figure 6:
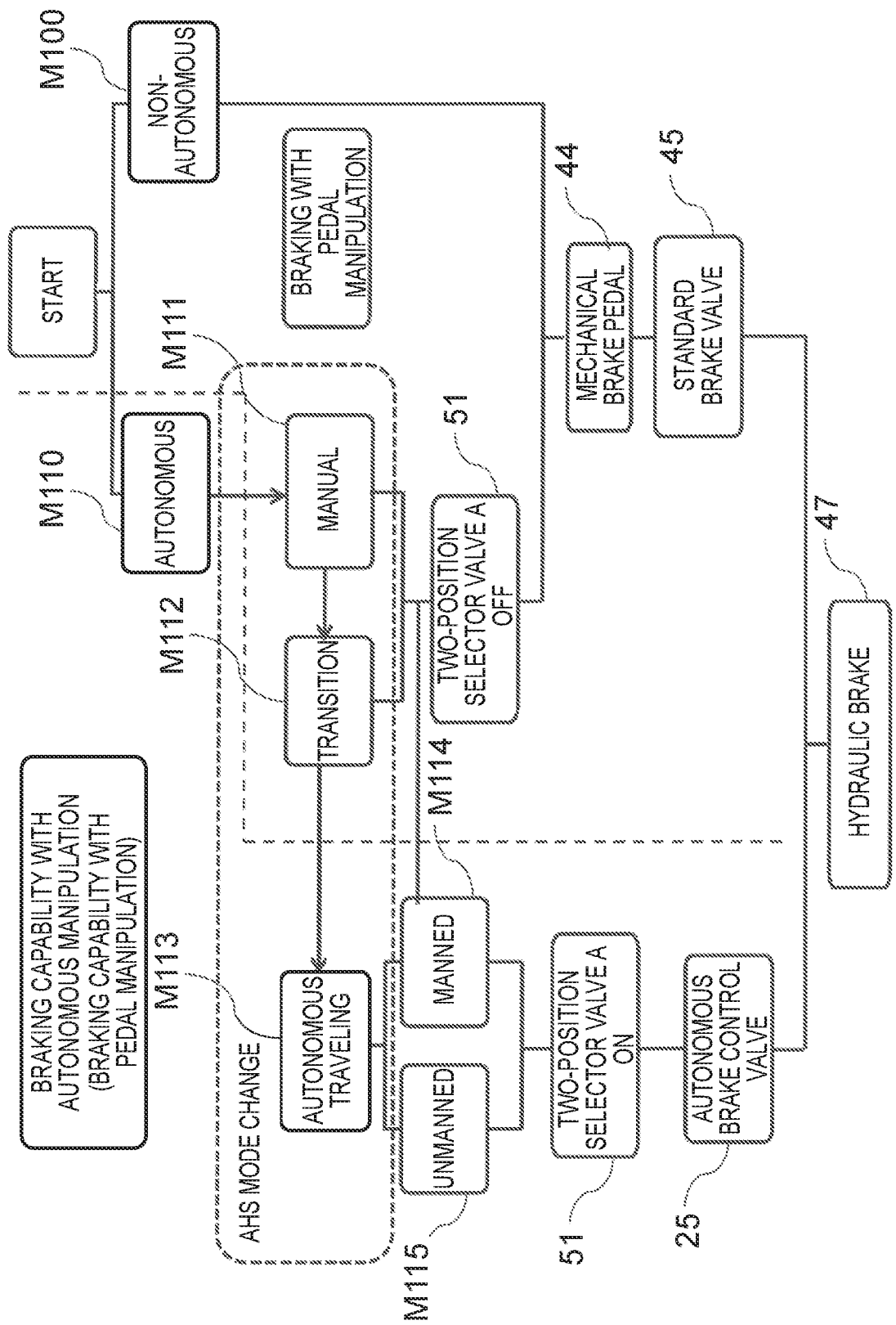
FIG. 6 is an explanatory actuation diagram (1) of a brake controller of the autonomous traveling vehicle of the second embodiment.
Figure 7:
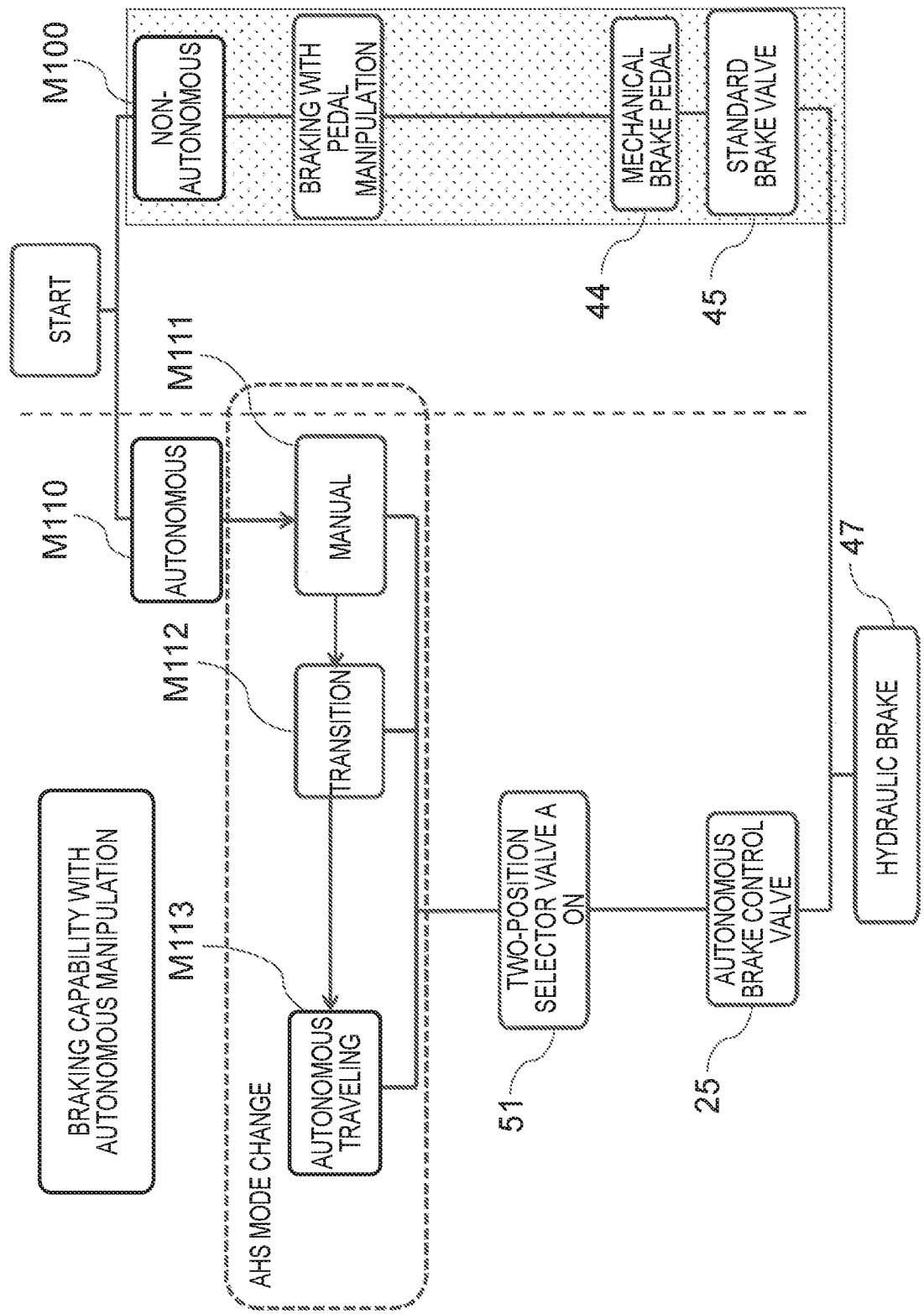
FIG. 7 is an explanatory actuation diagram (2) of a brake controller of the autonomous traveling vehicle of the second embodiment.

Here, a configuration overview of the brake controller of this embodiment is described with reference to FIGS. 5, 6, 7. The non-autonomous mode M100 is same to that in the first embodiment and a description is omitted. FIG. 6 is an explanatory actuation diagram (1) of the brake controller of the autonomous traveling vehicle according to the second embodiment. FIG. 7 is an explanatory actuation diagram (2) of the brake controller of the autonomous traveling vehicle according to the second embodiment.

For the autonomous mode M110, the mode change is performed to shift from the manual mode M111, the transition mode M112, to the autonomous traveling mode M113 in this order to achieve the autonomous travel. Then, the mode change may be performed at the operator' seat (FIG. 6) and may be performed above ground (FIG. 7).

Where the mode change is performed at the operator' seat (FIGS. 5, 6), upon turn-on of the autonomous traveling vehicle system power supply SW 21, the autonomous traveling vehicle starts the manual mode M111, and then the state of the autonomous traveling vehicle proceeds the transition mode M112. In these two states, the autonomous travel is not allowed yet, and hence the operator steps on the mechanical brake pedal 44 so that the standard brake valve 45 is moved to actuate the hydraulic brake 47 in order to stop the autonomous traveling vehicle 1. At this stage, the two-position selector valve A51 is turned off, that is, the two-position selector valve A51 is switched to the direction in which the pressure oil from the hydraulic pump 43 flows toward the hydraulic oil tank 48 (the fifth flow path). Therefore, the pressure oil from the hydraulic pump 43 is not provided to the autonomous brake control valve 25, so that the autonomous brake control is rendered inoperable. Then, the state of the autonomous traveling vehicle proceeds the autonomous traveling mode M113, and thus the autonomous brake control can be activated.

Here, after the state of the autonomous traveling vehicle proceeds the transition mode M112, the operator may leave the autonomous traveling vehicle 1 or may remain aboard the autonomous traveling vehicle 1.

In the case where the operator leaves, the first manual selector SW 52 is turned on, that is, the two-position selector valve A51 is switched to the direction in which the pressure oil from the hydraulic pump 43 flows toward the autonomous brake control valve 25 (a flow path downstream of the two-position selector valve A51 on the third flow path,). Then, after the operator has moved to a safe place, the control-center operator controls shifting to the autonomous traveling mode M113 from the autonomous control-center system 10.

In the unmanned state M115, the autonomous traveling vehicle 1 autonomously operates with no operator aboard, and the autonomous brake controller 24 opens the autonomous brake control valve 25 to actuate the hydraulic brake 47 in order to stop the autonomous traveling vehicle 1. At this stage, because the two-position selector valve A51 is on, the autonomous brake control is activated. The subsequent actuation of the autonomous brake control is the same as that in the first embodiment and a description is omitted.

In the case where the operator remains sit in the operator' seat, the operator gets in contact with the control-center operator to make a request to control shifting to the autonomous traveling mode M113 from the autonomous control-center system 10. In the manned state M114, the autonomous traveling vehicle 1 autonomously operates although with the operator aboard. At this stage, the two-position selector valve A51 is turned on, that is, the two-position selector valve A51 is switched to the direction in which the pressure oil from the hydraulic pump 43 flows toward the autonomous brake control valve 25 (a flow path downstream of the two-position selector valve A51 on the third flow path). Therefore, the brake may be autonomously actuated, the autonomous traveling vehicle 1 may be stopped, or alternatively, the operator may step on the mechanical brake pedal 44 to stop the autonomous traveling vehicle 1.

In the case where the mode change is performed above ground (FIGS. 5, 7), a starter (not shown) installed in a lower portion of the autonomous traveling vehicle 1 is used to perform an autonomous mode change. Then, upon turn-on of the autonomous traveling vehicle system power supply SW 21, the autonomous traveling vehicle starts the manual mode M111, and then the state of the autonomous traveling vehicle proceeds the transition mode M112. In the two states, because no operator aboard the operator' seat, it is impossible to operate the mechanical brake pedal 44 to stop the autonomous traveling vehicle 1. Therefore, using the autonomous control-center system 10, the brake is autonomously actuated to stop the autonomous traveling vehicle 1. At this stage, the two-position selector valve A51 is turned on, that is, the two-position selector valve A51 is switched to the direction in which the pressure oil from the hydraulic pump 43 flows toward the autonomous brake control valve 25 (a flow path downstream of the two-position selector valve A51 on the third flow path). Therefore, the autonomous brake control is activated. The subsequent actuation of the autonomous brake control is the same as that in the first embodiment and a description is omitted.

After the state of the autonomous traveling vehicle proceeds the transition mode M112, the operator turns on the first manual selector SW 52, then leaves the autonomous traveling vehicle 1 and moves to a safe place. Then, the control-center operator uses the autonomous control-center system 10 to control shifting to the autonomous traveling mode M113. In this state, the autonomous traveling vehicle 1 can be allowed to operate in an autonomous and unmanned manner. Then, the autonomous brake controller 24 opens the autonomous brake control valve 25 to actuate the hydraulic brake 47 in order to stop the autonomous traveling vehicle 1. At this stage, the two-position selector valve A51 is turned on, that is, the two-position selector valve A51 is switched to the direction in which the pressure oil from the hydraulic pump 43 flows toward the autonomous brake control valve 25. Therefore, the autonomous brake control can be activated. The subsequent actuation is the same as that in the first embodiment and a description is omitted.

In the brake controller of to the embodiment, in addition to the configuration in the first embodiment, the two-position selector valve A51 is added on the hydraulic piping (the third flow path) connecting between the hydraulic pump 43 and the autonomous brake control valve 25, and the fifth flow path is additionally installed to connect one of the downstream sides of the autonomous brake control valve 25 to the hydraulic oil tank 48. Switching the two-position selector valve A51 enables switching between ON and OFF of the function of the autonomous brake control.

According to the embodiment, where the operator in the autonomous traveling vehicle performs vehicle manipulation, the system for autonomously (automatically) actuating the brake is deactivated. Because of this, in the manual mode for operator manipulation under the power-on state of the autonomous traveling vehicle system, it is possible to prevent the brake from being autonomously (automatically) actuated to create an unsafe situation. In the manual mode, because the autonomous traveling vehicle system power supply SW 21 is in the power-on state, the autonomous function configuration section 20 is also being powered. Thus, the autonomous function configuration section 20 is activated, but the two-position selector valve A51 functions as a cutoff valve to cut off hydraulic oil supply, so that the automatic brake cannot be actuated. As a matter of course, the cutoff valve is active even in the state of the non-autonomous mode, and the hydraulic oil supply on the automatic brake side can be cut. Accordingly, it is possible to prevent the brake from being autonomously (automatically) actuated against operator intention to create an unsafe situation.

Third Embodiment

Figure 8:
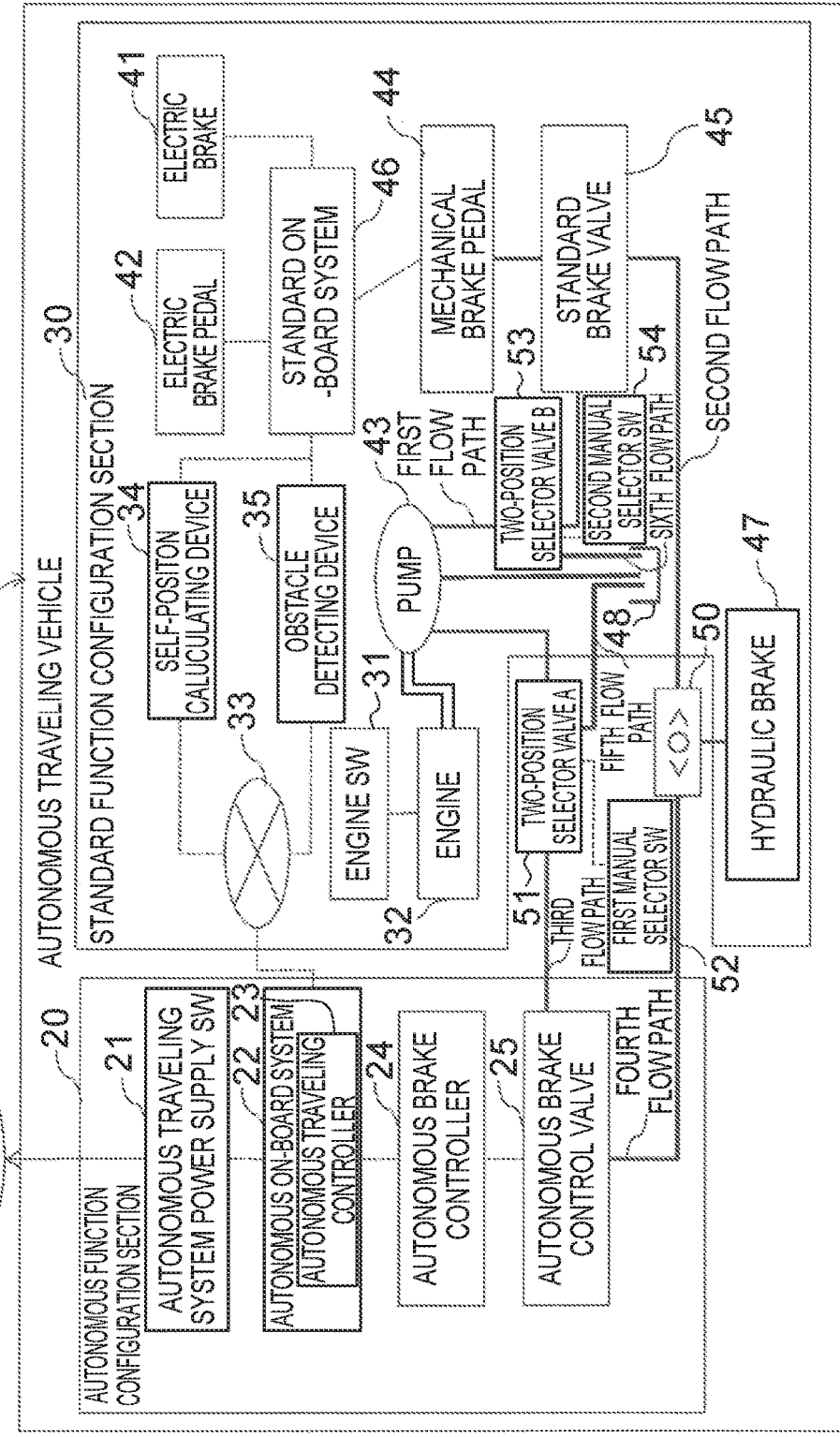
FIG. 8 is a diagram schematically illustrating the configuration of an autonomous traveling vehicle of a third embodiment.

FIG. 8 is a diagram schematically illustrating the configuration of an autonomous traveling vehicle according to a third embodiment.

Differences of an autonomous traveling vehicle according to the third embodiment from the second embodiment are that a two-position selector valve B53 (corresponding to a second two-position selector valve) is placed on the first flow path forming part of the hydraulic piping and connecting between the hydraulic pump 43 and the standard brake valve 45, and a second manual selector SW 54 (corresponding to a second manual operating device) is installed to perform switching operation between directions in which the pressure oil supplied from the two-position selector valve B53 should flow.

The two-position selector valve B53 is a valve to select whether the pressure oil from the hydraulic pump 43 is to flow into the standard brake valve 45 or return to the hydraulic oil tank 48. The flow-path switching is performed by the operator manually operating the second manual selector SW 54, rather than the control by the autonomous brake controller 24. As a result, the autonomous control-center system is inhibited from switching the two-position selector valve B53 contrary to operator's intention.

The two-position selector valve B53 switches between the flow path in which the pressure oil from the hydraulic pump 43 flows toward the standard brake valve 45 and a sixth flow path in which the pressure oil from the hydraulic pump 43 flows toward the hydraulic oil tank 48 (corresponding to a "second discharge flow path). In the former, the mechanical brake pedal 44 is operated, so that the pressure oil from the hydraulic pump 43 is supplied via the high-pressure selector valve 50 to the hydraulic brake 47, resulting in the autonomous traveling vehicle 1 being stopped.

In the latter, the pressure oil from the hydraulic pump 43 flows into the hydraulic oil tank 48, and therefore no pressure oil flows into the standard brake valve 45. Because of this, the autonomous traveling vehicle 1 is not able to be stopped by operating the mechanical brake pedal 44 to actuate the hydraulic brake 47. That is, the autonomous traveling vehicle 1 is configured to be able to select not to activate the hydraulic brake 47 by switching the two-position selector valve B53, even if the operator steps on the mechanical brake pedal 44.

Figure 9:
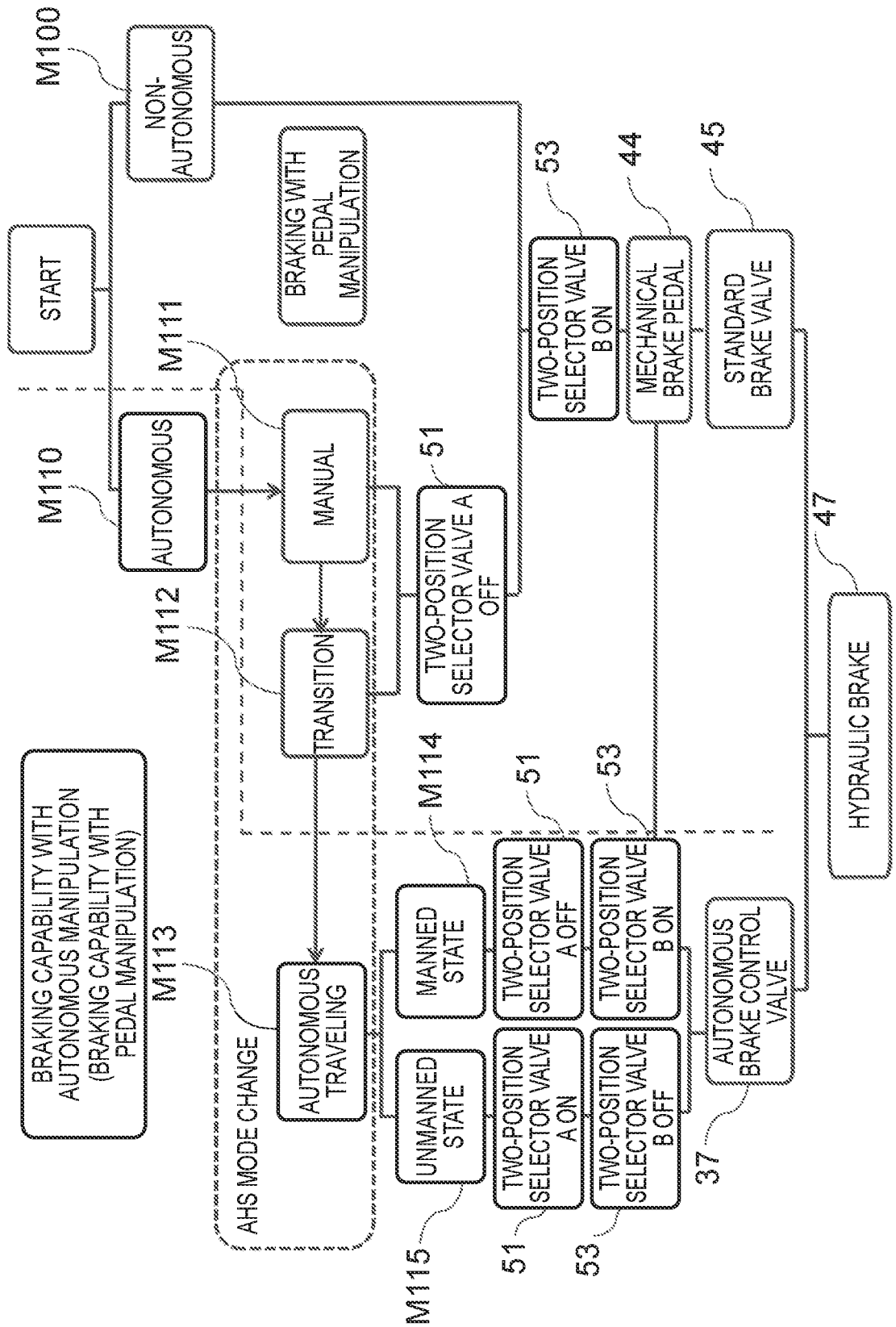
FIG. 9 is an explanatory actuation diagram (1) of a brake controller of the autonomous traveling vehicle of the third embodiment.

Here, a configuration overview of the brake controller according to the embodiment is described with reference to FIGS. 8, 9, 10. FIG. 9 is an explanatory actuation diagram (1) of the brake controller of the autonomous traveling vehicle according to the third embodiment. FIG. 10 is an explanatory actuation diagram (2) of the brake controller of the autonomous traveling vehicle according to the third embodiment. The non-autonomous mode M100 is same to that in the first and second embodiments and a description is omitted.

For the autonomous mode M110, the mode change is performed to shift from the manual mode M111, the transition mode M112, to the autonomous traveling mode M113 in this order to achieve the autonomous travel. Then, the mode change may be performed at the operator' seat (FIG. 9) and may be performed above ground (FIG. 10).

Where the mode change is performed at the operator' seat (FIGS. 8, 9), upon turn-on of the autonomous traveling vehicle system power supply SW 21, the autonomous traveling vehicle starts the manual mode M111, and then the state of the autonomous traveling vehicle proceeds the transition mode M112. In these two states, the autonomous travel is not allowed yet, and hence the operator steps on the mechanical brake pedal 44 so that the standard brake valve 45 is moved to actuate the hydraulic brake 47 in order to stop the autonomous traveling vehicle 1. At this stage, the two-position selector valve A51 is turned off, that is, the two-position selector valve A51 is switched to the direction in which the pressure oil from the hydraulic pump 43 flows toward the hydraulic oil tank 48, and the two-position selector valve B53 is turned on, that is, the two-position selector valve B53 is switched to the direction in which the pressure oil from the hydraulic pump 43 flows toward the standard brake valve 45 (a flow path downstream of the two-position selector valve B53 on the first flow path,). Therefore, the pressure oil is not provided to the autonomous brake control valve 25, so that the autonomous brake control is rendered inoperable, and also the hydraulic brake is rendered possible to be actuated by manipulation of the mechanical brake pedal 44. Then, the state of the autonomous traveling vehicle proceeds the autonomous traveling mode M113, and thus the autonomous traveling vehicle 1 can travel in an unmanned and autonomous manner.

Here, after the state of the autonomous traveling vehicle proceeds the transition mode M112, the operator may leave the autonomous traveling vehicle 1 or may remain aboard the autonomous traveling vehicle 1.

In the case where the operator leaves, the first manual selector SW 52 is turned on, that is, the two-position selector valve A51 is switched to the direction in which the pressure oil from the hydraulic pump 43 flows toward the autonomous brake control valve 25 (a flow path downstream of the two-position selector valve A51 on the third flow path), and also the second manual selector SW 54 is turned off, that is, the two-position selector valve B53 is switched to the direction in which the pressure oil from the hydraulic pump 43 flows toward the hydraulic oil tank 48 (the sixth flow path). Then, after the operator has moved to a safe place, the control-center operator controls shifting to the autonomous traveling mode M113 from the autonomous control-center system 10.

In the unmanned state M115, the autonomous traveling vehicle 1 autonomously operates with no operator aboard, and the autonomous brake controller 24 opens the autonomous brake control valve 25 to actuate the hydraulic brake 47 in order to stop the autonomous traveling vehicle 1. At this stage, because the two-position selector valve A51 is turned on, that is, the two-position selector valve A51 is switched to the flow path in which the pressure oil from the hydraulic pump 43 flows toward the autonomous brake control valve 25, and also the two-position selector valve B53 is turned off, that is, the two-position selector valve B53 is switched to the sixth flow path in which the pressure oil from the hydraulic pump 43 returns to the hydraulic oil tank 48, thereby making only the autonomous brake control possible. The subsequent actuation of the autonomous brake control is the same as that in the first embodiment and a description is omitted.

In the case where the operator remains sit in the operator' seat, the control-center operator controls shifting to the autonomous traveling mode M113 from the autonomous control-center system 10. In the manned state M114, the autonomous traveling vehicle 1 is capable of autonomously operating although with the operator aboard. At this stage, the two-position selector valve A51 is turned on, that is, the two-position selector valve A51 is switched to the flow path in which the pressure oil from the hydraulic pump 43 flows toward the autonomous brake control valve 25, and also the two-position selector valve B53 is turned on, that is, the two-position selector valve B53 is switched to the flow path in which the pressure oil from the hydraulic pump 43 flows toward the standard brake valve 45, thus enabling both the autonomous brake control and the brake control based on manipulation of the mechanical brake pedal 44.

In the case where the mode change is performed above ground (FIGS. 8, 10), a starter (not shown) installed in a lower portion of the autonomous traveling vehicle 1 is used to perform an autonomous mode change. Upon turn-on of the autonomous traveling vehicle system power supply SW 21, the autonomous traveling vehicle starts in the manual mode M111, and then the state of the autonomous traveling vehicle proceeds the transition mode M112. In the two states, because of no operator aboard the operator' seat, it is impossible to operate the mechanical brake pedal 44 to stop the autonomous traveling vehicle 1. Therefore, using the autonomous control-center system 10, the brake is autonomously actuated to stop the autonomous traveling vehicle 1. At this stage, the two-position selector valve A51 is turned on, that is, the two-position selector valve A51 is switched to the direction in which the pressure oil from the hydraulic pump 43 flows toward the autonomous brake control valve 25, and also the two-position selector valve B53 is turned off, that is the two-position selector valve B53 is switched to the flow path in which the pressure oil from the hydraulic pump 43 returns to the hydraulic oil tank 48, thereby enabling only the autonomous brake control. The subsequent actuation of the autonomous brake control is the same as that in the first embodiment and a description is omitted.

After the state of the autonomous traveling vehicle proceeds the transition mode M112, the operator turns on the first manual selector SW 52 and turns off the second manual selector SW 54. Then, the operator leaves the autonomous traveling vehicle 1 and then moves to a safe place. Then, the control-center operator controls shifting to the autonomous traveling mode M113 from the autonomous control-center system 10. In this state, the autonomous traveling vehicle 1 can be allowed to operate in an autonomous and unmanned manner. Then, the autonomous traveling vehicle 1 is stopped under the autonomous brake control. At this stage, the two-position selector valve A51 is turned on and also the two-position selector valve B53 is turned off, thereby enabling only the autonomous brake control. The subsequent actuation is the same as that in the first embodiment and a description is omitted.

In the brake controller according to the embodiment, in addition to the second embodiment, the two-position selector valve B53 is added on the hydraulic piping (the first flow path) connecting between the hydraulic pump 43 and the standard brake valve 45. Switching the two-position selector valve B53 enables switching between ON and OFF of the function of the standard brake valve.

According to the embodiment, the autonomous traveling vehicle (autonomous damp truck) is configured such that, where the operator does not operate (unmanned), the brake is unable to be actuated by the brake pedal manipulation. Because of this, in the autonomous traveling mode in which travel motion, turning motion, stop motion and the like are autonomously performed according to the instructions from the autonomous control-center system 10, in the situation of the unmanned operation without a person aboard the vehicle, it is possible that, if the brake pedal is operated by any factor (e.g. some substance falls to the brake pedal to press the pedal, etc.), a brake motion inconsistent with the instructions from the autonomous control-center system 10 or the like is prevented to be performed to create an unsafe situation.

Specifically, the autonomous traveling vehicle is configured such that, in all the work modes, the brake can be actuated by the brake pedal manipulation. Because of this, the brake pedal may be operated by some factor to bring the vehicle to a hard stop, which may create a more unsafe situation. To address this, as in the embodiment, the two-position selector valve B53 is installed as a cutoff valve to cut off hydraulic oil supply to the hydraulic circuit on the standard function side operated by the brake pedal. As a result, the brake actuated by the pedal manipulation can be disabled to prevent the brake from being actuated against the control-center instruction to create an unsafe situation.

The present invention is not limited to the above-described embodiments and any modification without departing the scope of the present invention is embraced in the present invention. For example, the third embodiment has been described as the configuration of adding the two-position selector valve B53 to the second embodiment, but the configuration of adding the two-position selector valve B53 to the first embodiment, that is, the aspect of including only the two-position selector valve B53 but not including the two-position selector valve A51, is possible.

Further, the embodiments have been described by using the example of manufacturing an autonomous traveling vehicle by modifying and retrofitting a standard machine with an autonomous function section. However, the present invention is also applicable to an autonomous traveling vehicle manufactured to be equipped with the standard feature and the autonomous traveling feature at the time of shipment from the factory.

The above-described autonomous control-center system 10 includes a control-center server (not shown) including a control-center controller, and the autonomous traveling controller 23, the control-center server and the autonomous traveling controller 23 being communicatively connected via wireless communication circuit. The autonomous brake controller 24 may include a controller which is different to the autonomous traveling controller 23. Further, the autonomous traveling controller 23 and the autonomous brake controller 24 may include a single controller which executes programs for implementation of the respective functions. The controller referred to herein may be a computer (hardware) having CPU (Central Processing Unit), memory, and storage, such as e.g. RAM (Random Access Memory), ROM (Read Only Memory), HDD (Hard Disk Drive), interconnected via a bus, or alternatively may be a computer configured by use of integrated circuitry tailored to each function.

Each of the first manual selector SW 52 (corresponding to the first manual operating device) and the second manual selector SW 54 (corresponding to the second manual operating device) may include a lever to open and close the flow path to switch between the directions in which the hydraulic oil should flow. Further, each of the first manual selector SW 52 and the second manual selector SW 54 may include a hard button for flow-path switching or a switch such as an input device which provides a switching instruction to a flow-path control controller performing the flow-path switching operation, a software button or the like.

REFERENCE SIGNS LIST

1 . . . Autonomous traveling vehicle
10 . . . Autonomous control-center system
20 . . . Autonomous function control section
25 . . . Autonomous brake control valve
30 . . . Standard function control section
45 . . . Standard brake valve
47 . . . Hydraulic brake
50 . . . High-pressure selector valve
51 . . . Two-position selector valve A
53 . . . Two-position selector valve B

The invention claimed is:

1. A work machine, comprising:
   an engine,
   a hydraulic oil tank that holds hydraulic oil,
   a hydraulic pump that is driven by the engine and delivers the hydraulic oil in the hydraulic oil tank as pressure oil,
   a standard brake valve that is supplied with the pressure oil delivered by the hydraulic pump,
   a brake pedal that allows the standard brake valve to open or close, and
   a hydraulic brake that is operated with the pressure oil supplied from the standard brake valve,
   wherein the work machine includes;
   an autonomous brake control valve that is supplied with the pressure oil delivered by the hydraulic pump,
   a first supply flow path in which the pressure oil is supplied from the hydraulic pump to the autonomous brake control valve,
   a second supply flow path in which pressure oil is supplied from the hydraulic pump to the standard brake valve,
   a high-pressure selector valve that is placed on a flow path in which pressure oil is supplied from the standard brake valve to the hydraulic brake,
   a flow path that connects the autonomous brake control valve and the high-pressure selector valve,
   an autonomous traveling controller that performs control for causing the work machine to travel in autonomous manner, and
   an autonomous brake controller that performs open or close control on the autonomous brake control valve in response to a braking instruction from the autonomous traveling controller;
   wherein pressure oil at a higher pressure between the pressure oil supplied from the standard brake valve and the pressure oil supplied from the autonomous brake control valve is supplied from the high-pressure selector valve to the hydraulic brake.

2. The work machine according to claim 1, further comprising:
   a first two-position selector valve that is placed on the first supply flow path, and
   a first manual operating device that includes either a lever or a switch for an operator of the work machine to perform switching operation between directions in which pressure oil supplied from the first two-position selector valve should flow;
   wherein the first two-position selector valve has an upstream side connected to the hydraulic pump via the first supply flow path, the first two-position selector valve has one of outlets on a downstream side connected to the autonomous brake control valve via the first supply flow path, and the first two-position selector valve has the other outlet on the downstream side connected to the hydraulic oil tank via a first discharge flow path.

3. The work machine according to claim 1, further comprising:
   a second two-position selector valve that is placed on the second supply flow path, and
   a second manual operating device that includes either a lever or a switch for an operator of the work machine to perform switching operation between directions in which pressure oil supplied from the second two-position selector valve should flow;
   wherein the second two-position selector valve has an upstream side connected to the hydraulic pump via the second supply flow path, the second two-position selector valve has one of outlets on a downstream side connected to the standard brake valve via the second supply flow path, and the second two-position selector valve has the other outlet on the downstream side connected to the hydraulic oil tank via a second discharge flow path.

* * * * *